(12) United States Patent
Nakayama (10) Patent No.: US 9,617,028 B2
(45) Date of Patent: Apr. 11, 2017

(54) BOTTLE

(75) Inventor: Tadayori Nakayama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 14/113,078

(22) PCT Filed: Apr. 26, 2012

(86) PCT No.: PCT/JP2012/061279
§ 371 (c)(1),
(2), (4) Date: Oct. 21, 2013

(87) PCT Pub. No.: WO2012/147885
PCT Pub. Date: Nov. 1, 2012

(65) Prior Publication Data
US 2014/0034659 A1 Feb. 6, 2014

(30) Foreign Application Priority Data

Apr. 28, 2011 (JP) ................................. 2011-101984
Dec. 27, 2011 (JP) ................................. 2011-285153

(51) Int. Cl.
*B65D 1/02* (2006.01)
*B29C 49/54* (2006.01)

(52) U.S. Cl.
CPC .......... *B65D 1/0284* (2013.01); *B29C 49/541* (2013.01); *B65D 1/0276* (2013.01); *B65D 2501/0036* (2013.01)

(58) Field of Classification Search
USPC ....................................................... 220/609
See application file for complete search history.

(56) References Cited

U.S. PATENT DOCUMENTS

2009/0159556 A1* 6/2009 Patcheak et al. ............. 215/373
2011/0017700 A1* 1/2011 Patcheak .............. B65D 1/0276
215/381

(Continued)

FOREIGN PATENT DOCUMENTS

CN        101801641 A    8/2010
EP         0 348 147 A2   12/1989

(Continued)

OTHER PUBLICATIONS

International Search Report issued in International Patent Application No. PCT/2012/061279 dated Jul. 24, 2012 (w/translation).

(Continued)

*Primary Examiner* — Fenn Mathew
*Assistant Examiner* — Madison L Poos
(74) *Attorney, Agent, or Firm* — Oliff PLC (57) ABSTRACT

A bottomed cylindrical bottle formed of a synthetic resin material through biaxially oriented blow molding, includes a bottom portion of the bottle having a bottom wall portion, the bottom wall portion including a ground portion disposed at an outer circumferential edge portion, a rising circumferential wall portion continuously extending upward so as to be connected to the ground portion from an inside in a bottle radial direction, a movable wall portion protruding from an upper end portion of the rising circumferential wall portion toward the inside in the bottle radial direction, and a recessed circumferential wall portion having a diameter in the bottle radial direction such that the diameter gradually decreases in a direction from an inner end portion of the movable wall portion toward an upper side thereof, an annular recess depressed upward being formed at the movable wall portion in a circumferential direction thereof.

5 Claims, 9 Drawing Sheets

(56) References Cited

U.S. PATENT DOCUMENTS

2011/0233166 A1    9/2011  Hiromichi et al.
2012/0037645 A1*  2/2012  Boukobza .................... 220/600

FOREIGN PATENT DOCUMENTS

| JP | 2007-269392 A | 10/2007 | |
|----|---------------|---------|---|
| JP | 2007-290772 A | 11/2007 | |
| JP | A-2008-24314 | 2/2008 | |
| WO | WO 2010/056517 A1 | 5/2010 | |
| WO | WO 2010/061758 * | 6/2010 | ............... B65D 1/02 |
| WO | WO 2010/061758 A1 | 6/2010 | |

OTHER PUBLICATIONS

Office Action issued in Chinese Patent Application No. 201280020226.7 dated Sep. 10, 2014 (with partial translation).
Oct. 9, 2014 Search Report issued in European Application No. 12775921.5.
May 12, 2015 Office Action issued in Japanese Application No. 2011-285153.
Jan. 14, 2016 Office Action issued in Taiwanese Patent Application No. 101115278.

\* cited by examiner

BOTTLE

BACKGROUND OF THE INVENTION

Field of the Invention

The present invention relates to a bottle.

Priority is claimed on Japanese Patent Application No. 2011-101984, filed Apr. 28, 2011, and Japanese Patent Application No. 201.1-285153, filed Dec. 27, 2011, the contents of which are incorporated herein by reference.

Description of Related Art

Conventionally, as a bottomed cylindrical bottle formed of a synthetic resin material, a constitution that absorbs decompression in the bottle is known. The conventional bottle includes, for example, as described in the following Patent Document 1 (PCT International Publication No. WO2010/061758), a ground portion having a bottom wall portion of a bottom portion disposed at an outer circumferential edge portion, a rising circumferential wall portion extending upward so as to be connected to the ground portion from the inside in a bottle radial direction, a movable wall portion protruding from an upper end portion of the rising circumferential wall portion toward the inside of the bottle radial direction, and a recessed circumferential wall portion extending upward from an inner end portion in the bottle radial direction of the movable wall portion. A constitution in which decompression in the bottle is absorbed as the bottom wall portion pivots about a connecting portion with the rising circumferential wall portion such that the movable wall portion allows the recessed circumferential wall portion to move upward is known.

However, in the conventional bottle, there is room for improvement of decompression absorption performance.

SUMMARY OF THE INVENTION

Here, in consideration of the above-mentioned circumstances, it is an aspect of the present invention to provide a bottle capable of improving decompression absorption performance in the bottle.

In order to solve the problems, the present invention proposes the following features.

A bottle according to a first aspect of the present invention includes: a bottomed cylindrical bottle formed of a synthetic resin material through biaxially oriented blow molding, including a bottom portion of the bottle having a bottom wall portion, the bottom wall portion including: a ground portion disposed at an outer circumferential edge portion; a rising circumferential wall portion continuously extending upward so as to be connected to the ground portion from an inside in a bottle radial direction; a movable wall portion protruding from an upper end portion of the rising circumferential wall portion toward the inside in the bottle radial direction; and a recessed circumferential wall portion having a diameter in the bottle radial direction such that the diameter gradually decreases in a direction from an inner end portion of the movable wall portion toward an upper side thereof, wherein an annular recess depressed upward is formed at the movable wall portion in a circumferential direction thereof.

According to the above-mentioned features, since the annular recess is formed at the movable wall portion, in a process of forming the bottle using a preform through biaxially oriented blow molding, when the material arrives at an area in the cavity inner surface in which the annular recess is formed, the force of the flow of the synthetic resin material is weakened. Accordingly, the synthetic resin material that forms an area in the movable wall portion disposed at the outside in the bottle radial direction farther than the annular recess (hereinafter referred to as an outer sidewall portion) can extend more than the synthetic resin material that forms an area in the recessed circumferential wall portion and the movable wall portion disposed closer to the inside in the bottle radial direction than the annular recess (hereinafter referred to as an inner sidewall portion).

Accordingly, a thickness of the above-mentioned outer sidewall portion is formed to be thinner than that of the inner sidewall portion so that deformation can easily occur (the movable wall portion is easily displaced upward), and thus decompression absorption performance of the bottle can be improved.

In addition, according to the bottle of a second aspect of the present invention, in the first aspect, the movable wall portion may have a curved surface protruding downward.

In this case, upon the decompression in the bottle, the movable wall portion can be largely and easily deformed toward the inside of the bottle, and thus decompression absorption performance of the bottle can be more securely improved.

Further, according to the bottle of a third aspect of the present invention, in the first aspect, the inner end portion connected to the inner end in the bottle radial direction of the annular recess in the movable wall portion may gradually extend upward in a direction from the inside toward the outside in the bottle radial direction, and the outer end portion connected to the outer end in the bottle radial direction of the annular recess in the movable wall portion may gradually extend downward in a direction from the inside toward the outside in the bottle radial direction.

In addition, according to the bottle of a fourth aspect of the present invention, in the second aspect, the inner end portion connected to the inner end in the bottle radial direction of the annular recess in the movable wall portion may gradually extend upward in a direction from the inside toward the outside in the bottle radial direction, and the outer end portion connected to the outer end in the bottle radial direction of the annular recess in the movable wall portion may gradually extend downward in a direction from the inside toward the outside in the bottle radial direction.

In this case, since the area in the movable wall portion that connects the recessed circumferential wall portion and the annular recess gradually extends upward in a direction from the inside toward the outside in the bottle radial direction, in a process of forming the bottle as described above, when the material arrives at the area at which the annular recess of the cavity inner surface is formed, the force of a flow of the synthetic resin material can be effectively weakened.

In addition, since the area in the movable wall portion connected to the outer end in the bottle radial, direction of the annular recess gradually extends downward in a direction from the inside toward the outside in the bottle radial direction, in the process of forming the bottle as described above, after passing through the area in which the annular recess of the cavity inner surface is formed, the synthetic resin material can smoothly flow toward the outside in the bottle radial direction. Accordingly, the above-mentioned outer sidewall portion can be extended to reduce the thickness thereof.

According to the bottle of a fifth aspect of the present invention, in the first aspect, the movable wall portion may be disposed to be movable upward with the recessed circumferential wall portion around a connecting portion with the rising circumferential wall portion, and the inner portion disposed closer to the inside in the radial direction than the annular recess of the movable wall portion and the recessed circumferential wall portion may be disposed to be movable upward and around the annular recess.

According to the above-mentioned features, according to the decompression in the bottle, since the area of the movable wall portion and the recessed circumferential wall portion disposed closer to the inside in the radial direction than the annular recess (hereinafter referred to as an inner portion) can be moved upward and the bottom wall portion can be actively deformed while moving the movable wall portion upward with the recessed circumferential wall portion around the connecting portion with the rising circumferential wall portion, decompression absorption performance of the bottle can be improved.

In addition, upon the decompression in the bottle, the annular recess can be easily deformed to increase the size in the radial direction, and a sufficient upward movement amount of the recessed circumferential wall portion can be easily secured.

According to the bottle of a sixth aspect of the present invention, in the fifth aspect, a rib may be formed at the inner portion along with the circumferential direction, and the rib may be formed through biaxially oriented blow molding.

In this case, an area of the movable wall portion and the recessed circumferential wall portion disposed between the rib and the annular recess (hereinafter referred to as an intermediate portion) can be formed to have a small thickness, and the intermediate portion can be easily deformed. Accordingly, the above-mentioned inner portion of the recessed circumferential wall portion can be more easily moved upward and around the annular recess, and thus the decompression absorption performance can be securely improved.

According to the above-mentioned bottle, decompression absorption performance in the bottle can be improved.

DETAILED DESCRIPTION OF THE INVENTION

[First Embodiment]

Hereinafter, a bottle according to a first embodiment of the present invention will be described with reference to the accompanying drawings.

Figure 1:
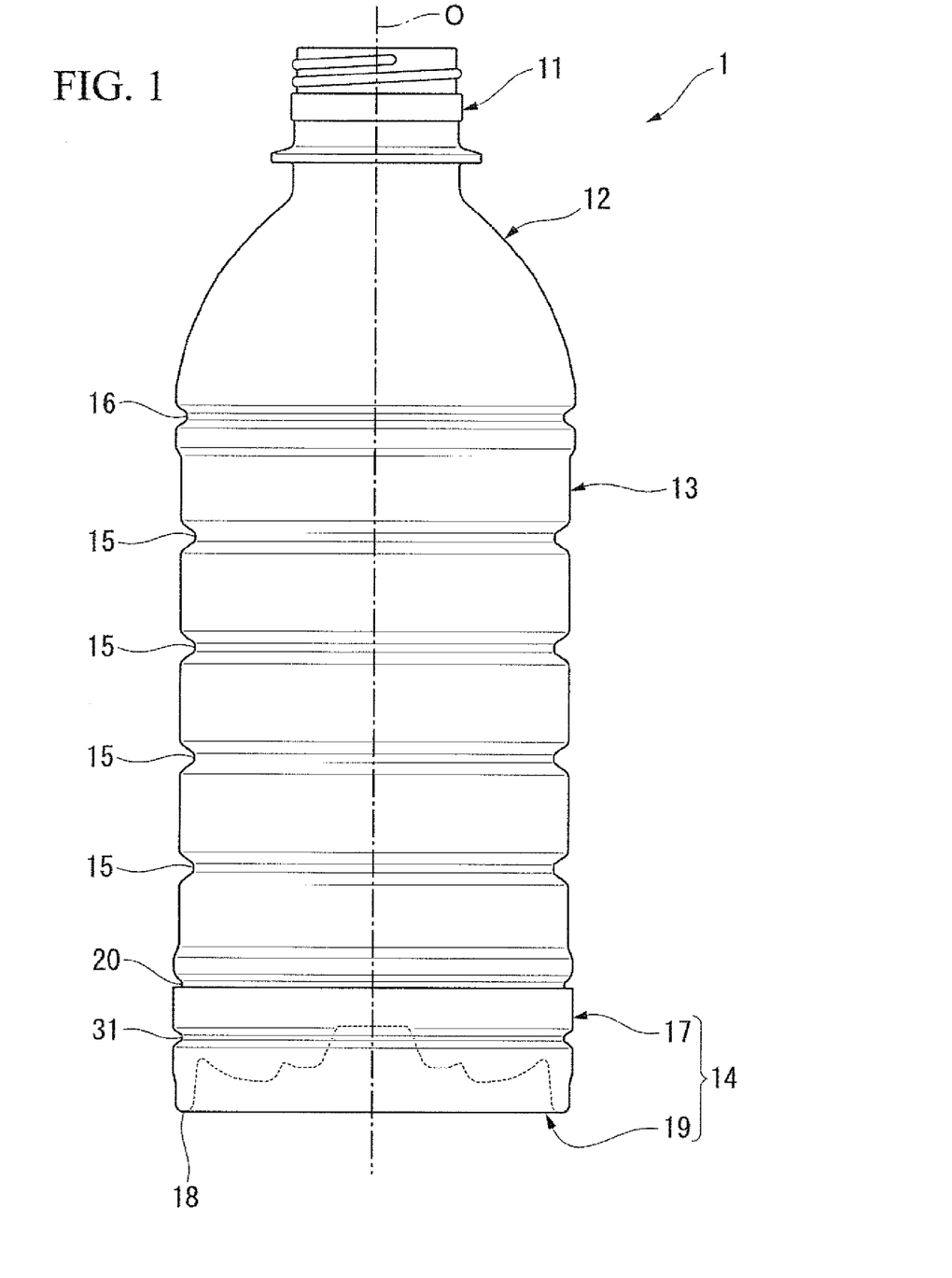
FIG. 1 is a side view of a bottle according to a first embodiment of the present invention.
Figure 2:
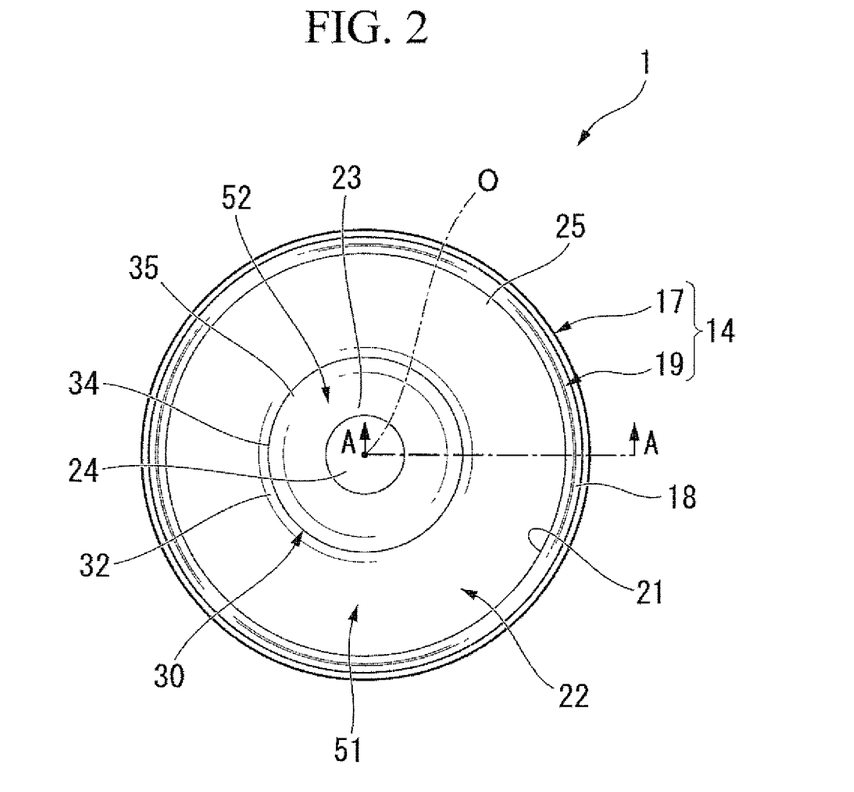
FIG. 2 is a bottom view of the bottle according to the first embodiment of the present invention.

As shown in FIGS. 1 and 2, a bottle 1 according to the embodiment includes a mouth portion 11, a shoulder portion 12, a drum portion 13, and a bottom portion 14. The bottle 1 has a schematic constitution in which the components 11 to 14 are installed in sequence in a state in which central axes of the components 11 to 14 are disposed on a common axis.

Hereinafter, the above-mentioned common axis is referred to as a bottle axis O, the mouth portion 11 side in the bottle axis O direction is referred to as an upper side, the bottom portion 14 side is referred to as a lower side, a direction perpendicular to the bottle axis O is referred to as a radial direction, and a direction around the bottle axis O is referred to as a circumferential direction.

The bottle 1 has a constitution that a bottomed cylindrical preform formed through injection molding is integrally formed of a synthetic resin material through biaxially oriented blow molding. In addition, a cap (not shown) is mounted on the mouth portion 11. Further, the mouth portion 11, the shoulder portion 12, the drum portion 13, and the bottom portion 14 have a circular shape perpendicular to the bottle axis O in view of a lateral cross-sectional direction.

The shoulder portion 12 has a curved surface having a diameter in the radial direction such that the diameter gradually increases in the direction from the upper side to the lower side and protruding outward in the radial direction. In addition, a reinforcement groove 16 is formed at a lower end portion of the shoulder portion 12 (a connecting portion between the shoulder portion 12 and the drum portion 13) throughout the entire circumference. The reinforcement groove 16 is a groove portion (a recessed rib) configured to increase the rigidity of the shoulder portion 12.

The drum portion 13 is formed in a tubular shape, and a space between both of end portions in the bottle axis O direction has a smaller diameter than that of both of the end portions. A plurality of first annular recessed grooves 15 are continuously formed at the drum portion 13 in the bottle axis O direction at an interval throughout the entire circumference.

A second annular recessed groove 20 is continuously formed at the connecting portion between the drum portion 13 and the bottom portion 14 throughout the entire circumference.

The bottom portion 14 having a cup shape includes a heel portion 17 having an upper end opening mouth portion connected to a lower end opening mouth portion of the drum portion 13, and a bottom wall portion 19 configured to close a lower end opening mouth portion of the heel portion 17 and in which an outer circumferential edge portion becomes a ground portion 18.

A third annular recessed groove 31 having the same depth as the second annular recessed groove 20 is continuously formed at the heel portion 17 throughout the entire circumference.

Figure 3:
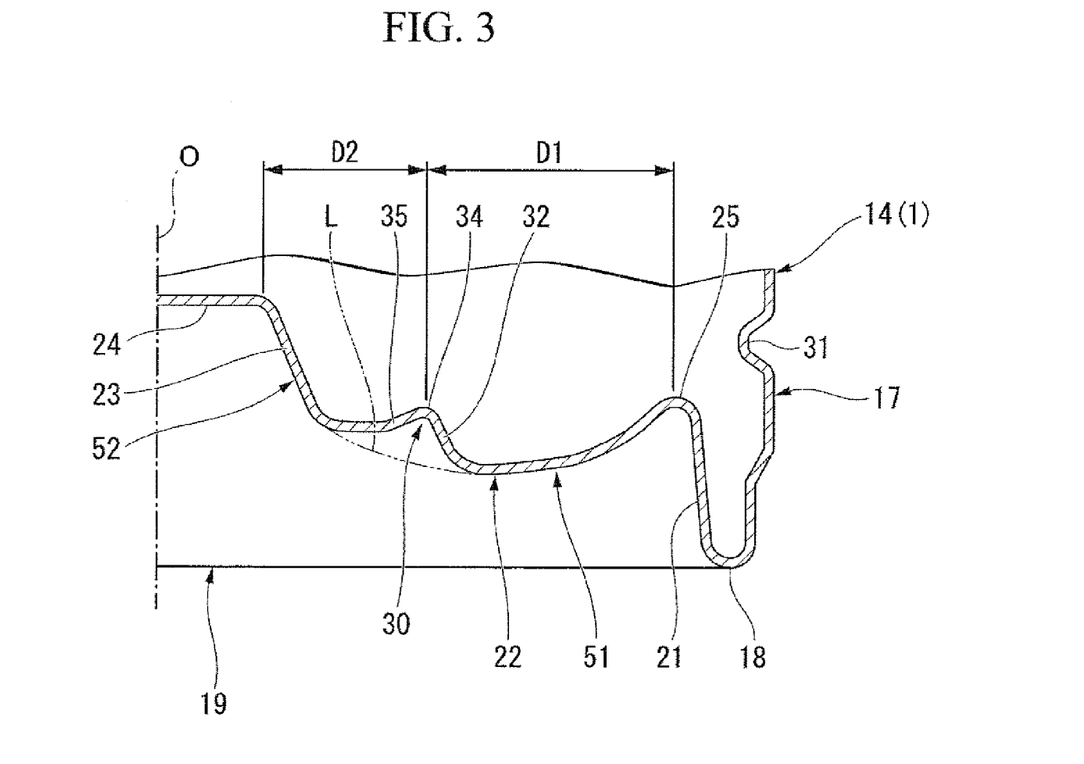
FIG. 3 is a cross-sectional view taken along line A-A of FIG. 2.

As shown in FIGS. 2 and 3, the bottom wall portion 19 includes a rising circumferential wall portion 21 extending upward so as to be connected to the ground portion 18 from the inside of the bottle in the radial direction toward the upper side, an annular movable wall portion 22 protruding from the upper end portion of the rising circumferential wall portion 21 toward the inside of the bottle in the radial direction, an annular recessed circumferential wall portion 23 having a diameter in the radial direction such that the diameter gradually decreases with directed to upward from the inner end portion of the movable wall portion 22, and a closing wall portion 24 configured to close the upper end opening mouth portion of the recessed circumferential wall portion 23.

The movable wall portion 22 has a curved surface protruding downward. The movable wall portion 22 and the rising circumferential wall portion 21 are connected via a curved surface portion 25 protruding upward. Then, the movable wall portion 22 is pivotable about the curved surface portion 25 such that the recessed circumferential wall portion 23 is moved upward.

The recessed circumferential wall portion 23 is disposed concentrically with the bottle axis O, and continuously installed at the inner end portion in the radial direction of the movable wall portion 22. Accordingly, the recessed circumferential wall portion 23 has a diameter in the radial direction that gradually decreases in the direction from the lower side to the upper side.

In addition, an annular recess 30 recessed upward is continuously formed at an inner circumferential side in the movable wall portion 22 throughout the entire circumference in the circumferential direction. The annular recess 30 is divided into an apex portion 34, an outer curved wall (an outer end portion) 32 connected to the apex portion 34 from the outside in the radial direction, and an inner curved wall (an inner end portion) 35 connected to the apex portion 34 from the inside in the radial direction.

The outer curved wall 32 has a curved surface that gradually extends downward in the direction from the inside to the outside in the radial direction and protrudes (swells) downward. Then, the upper end portion of the outer curved wall 32 is connected to the outer end portion in the radial direction of the apex portion 34.

Further, an inner curved wall 35 has a curved surface that gradually extends upward in the direction from the inside to the outside in the radial direction and protrudes downward. Then, the upper end portion of the inner curved wall 35 is connected to the inner end portion in the radial direction of the apex portion 34.

The apex portion 34 of the annular recess 30 has a curved surface protruding upward. That is, the annular recess 30 has a curved surface recessed to have a size in the radial direction that gradually decreases overall in the direction from the lower side to the upper side, and the apex portion 34 disposed at an upper end thereof protrudes upward. In addition, the radii of curvature of the above-mentioned apex portion 34, the movable wall portion 22, and the curved surface portion 25 are formed so that the radii of curvature of the movable wall portion 22 is smaller than the radii of curvature of the curved surface portion 25, and the radii of curvature of the curved surface portion 25 is smaller than the radii of curvature of the apex portion 34.

The apex portion 34 of the annular recess 30 is disposed under the upper end portion of the above-mentioned curved surface portion 25 and over the inner curved wall 35. In addition, the annular recess 30 is disposed over an imaginary line L extending along with a surface shape of the outer end portion in the radial direction of the outer curved wall 32 and the inner end portion in the radial direction of the inner curved wall 35 (a connecting portion with the recessed circumferential wall portion 23). Further, in a shown example, the outer curved wall 32 and the inner curved wall 35 are also disposed over the imaginary line L.

In addition, a length D1 in the radial direction from the curved surface portion 25 to the apex portion 34 of the annular recess 30 is larger than a length D2 in the radial direction from the apex portion 34 to the outer circumferential edge of the closing wall portion 24.

Here, in the bottom wall portion 19 of the embodiment, a thickness of a portion in the movable wall portion 22 disposed further outside in the radial direction than the apex portion 34 of the annular recess 30, specifically, a portion disposed further outside in the radial direction than the outer curved wall 32 and the inner curved wall 35 (hereinafter referred to as an outer sidewall portion 51), is thinner than those of the inner curved wall 35 of the recessed circumferential wall portion 23 and the movable wall portion 22 (hereinafter, collectively referred to as an inner sidewall portion 52).

In manufacture of the above-mentioned bottle 1 through biaxially oriented blow molding, first, a bottomed cylindrical preform formed of a synthetic resin material is manufactured through injection molding. Then, after the preform is set in a cavity, air is blown into the preform to perform blow forming. Accordingly, as the preform is extended and expanded in both the bottle axis O direction and the radial direction, the bottomed cylindrical bottle 1 following the inner surface of the cavity is molded.

Here, in the bottle 1 of the embodiment, since the annular recess 30 is formed at the movable wall portion 22, in a process of forming the bottle 1 through the biaxially oriented blow molding using the preform, a force of the flow of the synthetic resin material is weakened when the material arrives at an area in the cavity inner surface at which the annular recess 30 (the apex portion 34) is formed. Accordingly, in comparison with the synthetic resin material that forms the inner sidewall portion 52, the synthetic resin material that forms the above-mentioned outer sidewall portion 51 can be further extended. Accordingly, the thickness of the outer sidewall portion 51 is formed to be thinner than that of the inner sidewall portion 52.

Then, when the inside of the bottle 1 manufactured as described above is decompressed, as shown in FIG. 4, first, as the outer sidewall portion 51 upwardly pivots about the curved surface portion 25 of the bottom wall portion 19, the outer sidewall portion 51 is moved so as to raise the inner sidewall portion 52 upward. That is, as the bottom wall portion 19 of the bottle 1 is actively varied upon the decompression, the internal pressure variation (decompression) of the bottle 1 can be absorbed without deformation of the drum portion 13 or the like. In this case, as the connecting portion between the rising circumferential wall portion 21 and the movable wall portion 22 is formed at the curved surface portion 25 protruding upward, the outer sidewall portion 51 can be easily moved (pivoted) around the upper end portion of the rising circumferential wall portion 21. For this reason, the outer sidewall portion 51 can be flexibly deformed according to the internal, pressure variation of the bottle 1.

Figure 4:
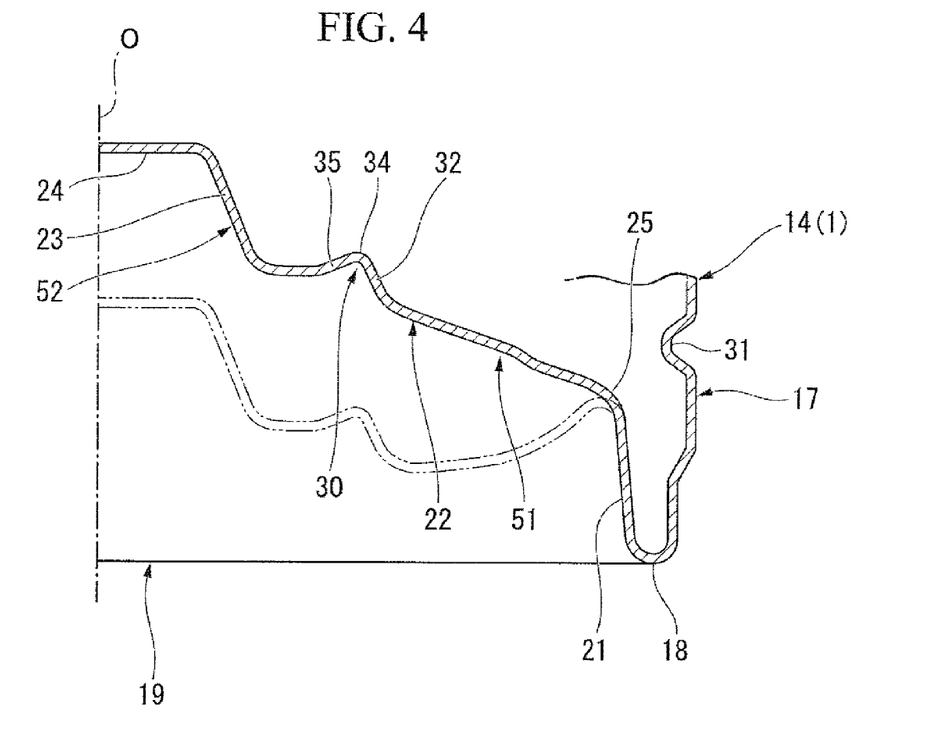
FIG. 4 is a cross-sectional view of a bottle bottom wall portion showing a bottle decompression state.

In particular, according to the embodiment, as the above-mentioned annular recess 30 is formed, when the bottle 1 formed of the synthetic resin material is manufactured through the biaxially oriented blow molding, the thickness of the outer sidewall portion 51 can be formed to be thinner than that of the inner sidewall portion 52. Accordingly, the outer sidewall portion 51 in the bottom wall portion 19 can be easily deformed, and thus decompression absorption performance of the bottle 1 can be improved.

However, the inner curved wall 35 gradually extends upward in the direction from the inside to the outside in the radial direction. Accordingly, in the process of forming the bottle 1 as described above, the force of the flow of the synthetic resin material can be effectively weakened when the material arrives at an area in the cavity inner surface in which the apex portion 34 of the annular recess 30 is formed.

In addition, the outer curved wall 32 gradually extends downward in the direction from the inside to the outside in the radial direction. Accordingly, in the process of forming the bottle 1 as described above, after passing through the area in the cavity inner surface in which the apex portion 34 of the annular recess 30 is formed, the synthetic resin material toward the outside in the radial direction can smoothly flow. Accordingly, the above-mentioned outer sidewall portion 51 can extend to effectively reduce the thickness thereof.

Further, as the movable wall portion 22 has a curved surface protruding downward, upon the decompression in the bottle 1, the movable wall portion 22 can be largely and easily deformed toward the inside of the bottle 1. As a result, the decompression absorption performance of the bottle 1 can be more securely improved.

Hereinabove, while the first embodiment of the present invention has been described in detail with reference to the accompanying drawings, the specific constitution is not limited to the embodiment but may include design changes within a range not departing from the scope of the present invention.

For example, in the above-mentioned embodiment, while the case in which the annular recess 30 is continuously formed throughout the entire circumference in the circumferential direction has been described, the embodiment is not limited thereto. For example, the annular recess 30 may be intermittently formed or continuously extend throughout the entire circumference in the circumferential direction.

In addition, the plurality of annular recesses 30 may be formed in the radial direction at an interval.

Further, a cross-sectional shape of the annular recess 30 may be appropriately design-changed into a circular shape, a rectangular shape, or the like. Furthermore, the size of the annular recess 30 may be varied.

In addition, in the above-mentioned embodiment, while the case in which the outer curved wall 32 and the inner curved wall 35 are disposed over the imaginary line L has been described, the embodiment is not limited thereto.

[Second Embodiment]

Hereinafter, a bottle according to a second embodiment of the present invention will be described with reference to the accompanying drawings.

Figure 5:
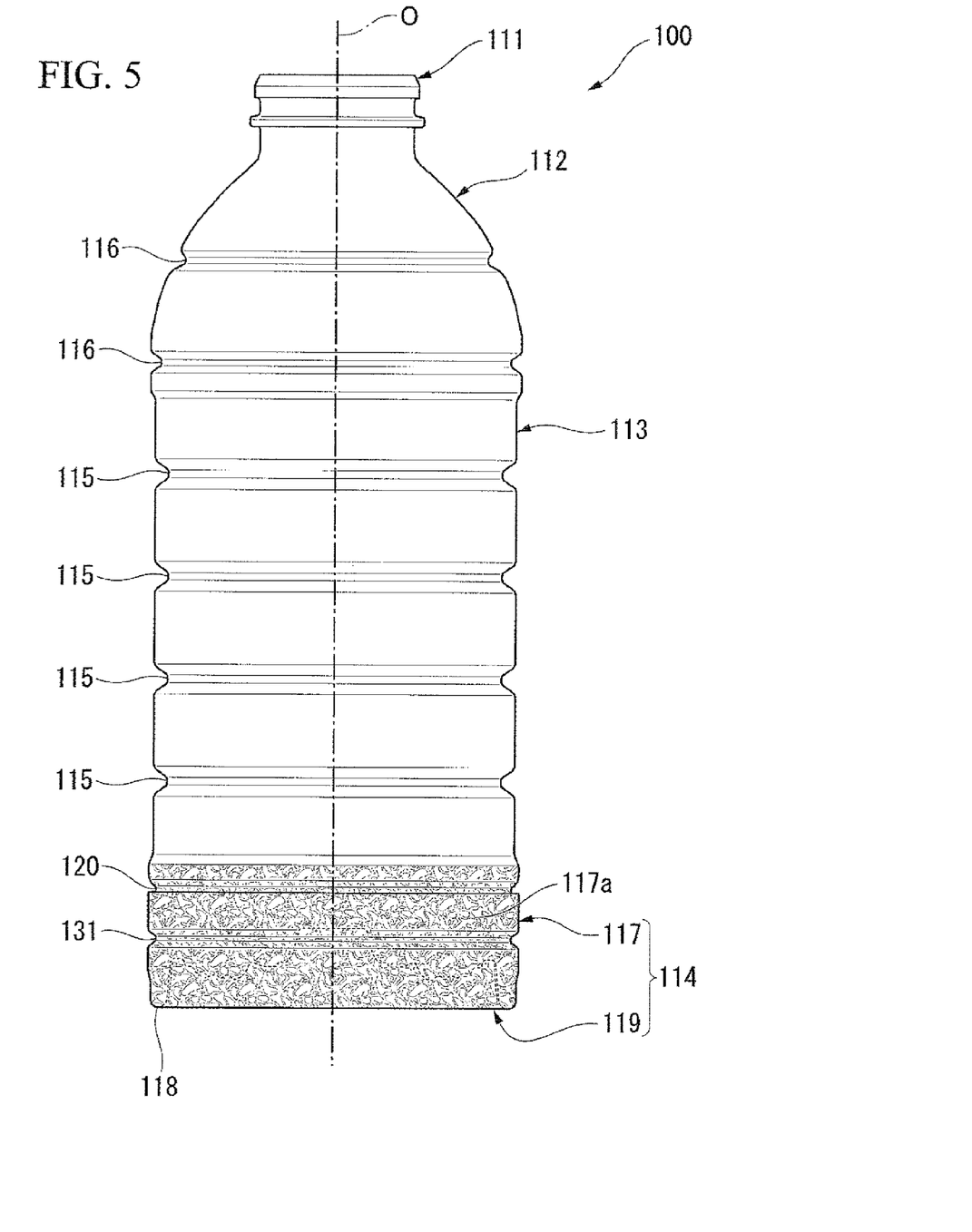
FIG. 5 is a side view of a bottle according to a second embodiment of the present invention.
Figure 6:
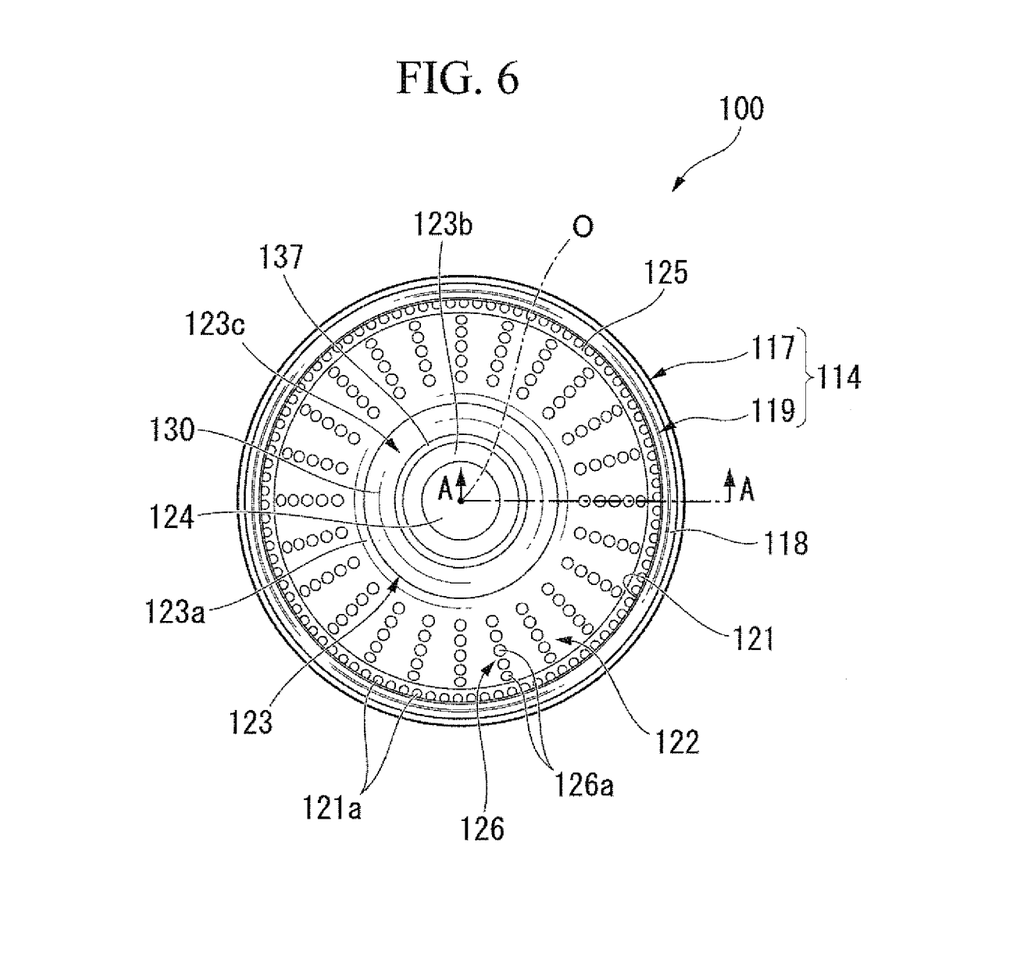
FIG. 6 is a bottom view of the bottle according to the second embodiment of the present invention.
Figure 7:
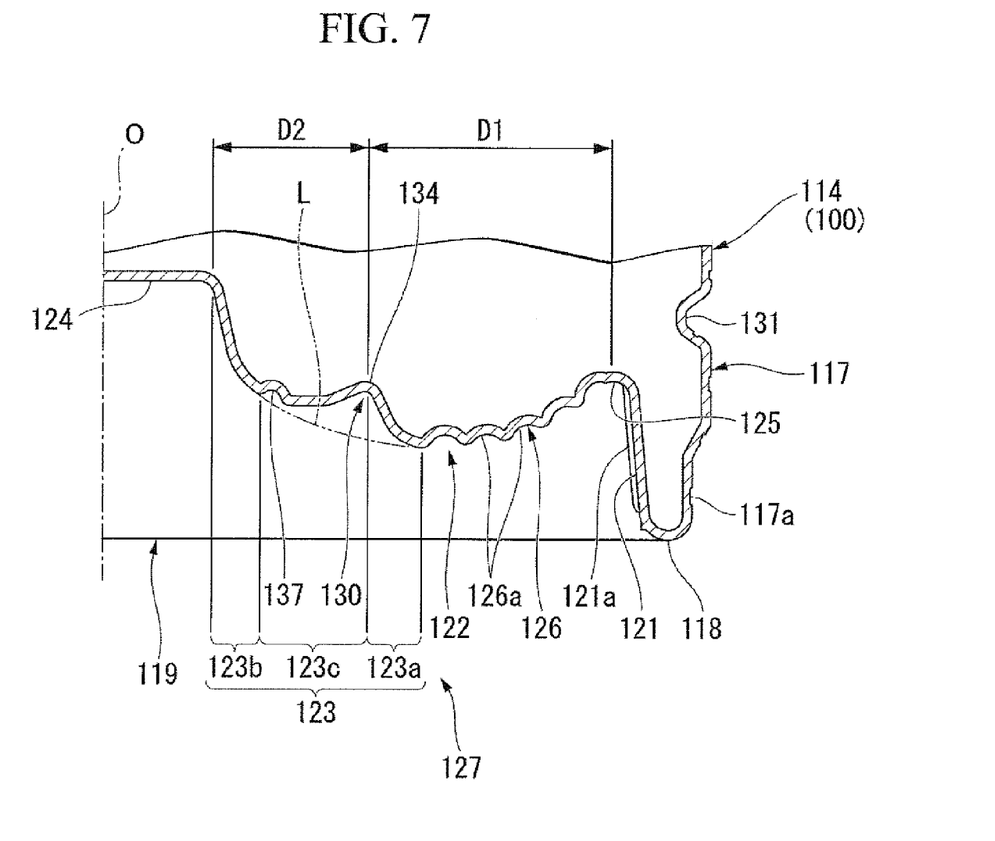
FIG. 7 is a cross-sectional view taken along line A-A of FIG. 6.

As shown in FIGS. 5 to 7, a bottle 100 according to the embodiment includes a mouth portion 111, a shoulder portion 112, a drum portion 113, and a bottom portion 114. The bottle 100 has a schematic constitution in which the components 111 to 114 are continuously installed in sequence in a state in which central axes of the components 111 to 114 are disposed on a common axis.

Hereinafter, the above-mentioned common axis is referred to as a bottle axis O, the mouth portion 111 side in the bottle axis O direction is referred to as an upper side, the bottom portion 114 side is referred to as a lower side, a direction perpendicular to the bottle axis O is referred to as a radial direction, and a direction around the bottle axis O is referred to as a circumferential direction.

In addition, the bottle 100 has a constitution that a bottomed cylindrical preform formed through injection molding is integrally formed of a synthetic resin material through biaxially oriented blow molding. In addition, a cap (not shown) is mounted on the mouth portion 111. Further, the mouth portion 111, the shoulder portion 112, the drum portion 113, and the bottom portion 114 have a circular shape perpendicular to the bottle axis O in view of a lateral cross-sectional direction.

The shoulder portion 112 has a curved surface having a diameter in the radial direction such that the diameter gradually increases in the direction from the upper side to the lower side and protrudes outward in the radial direction. In addition, a plurality of (for example, two) reinforcement grooves 116 are formed at the shoulder portion 112 in the bottle axis O direction at an interval throughout the entire circumference. The reinforcement grooves 116 are groove portions (recessed ribs) configured to increase the rigidity of the shoulder portion 112.

The drum portion 113 is formed in a tubular shape, and a space between both of end portions in the bottle axis O direction has a smaller diameter than either of the end portions. A plurality of first annular recessed grooves 115 are continuously formed at the drum portion 113 in the bottle axis O direction at an interval throughout the entire circumference.

A second annular recessed groove 120 is continuously formed at the connecting portion between the drum portion 113 and the bottom portion 114 throughout the entire circumference.

The bottom portion 114 having a cup shape includes a heel portion 117 having an upper end opening mouth portion connected to a lower end opening mouth portion of the drum portion 113, and a bottom wall portion 119 configured to close a lower end opening mouth portion of the heel portion 117 and in which a bottom wall portion 119 becomes a ground portion 118.

A third annular recessed groove 131 having the same depth as the second annular recessed groove 120 is continuously formed at the heel portion 117 throughout the entire circumference.

Further, in the embodiment, an uneven portion 117a having a low protrusion height (for example, surface texturing) is formed at an outer circumferential surface of the heel portion 117 and an outer circumferential surface of a lower end portion of the drum portion 113 (see FIG. 5). Accordingly, in a filling process, when the plurality of bottles 100 are continuously stood and conveyed, close contacts and non-smooth sliding between the outer circumferential surfaces of the heel portions 117 of the neighboring bottles 100 and the outer circumferential surfaces of the lower end portions of the drum portions 113 are suppressed, i.e., generation of blocking is suppressed. In addition, in a shown example, an uneven portion 117a is also formed on a surface of the second annular recessed groove 120 and a surface of the third annular recessed groove 131.

As shown in FIGS. 6 and 7, the bottom wall portion 119 includes a rising circumferential wall portion 121 continuously extending upward so as to be connected to the ground portion 118 from the inside in the radial direction, an outer movable wall portion 122 having a curved surface protruding downward, an annular curved portion 123 having a diameter in the radial direction such that the diameter gradually decreases in the direction from the inner end portion of the outer movable wall portion 122 to the upper side, and a closing wall portion 124 configured to close the upper end opening mouth portion of the curved portion 123.

In addition, an annular movable wall portion 127 protruding from the upper end portion of the rising circumferential wall portion 121 toward the inside in the radial direction is constituted by the outer movable wall portion 122, a lower tubular portion 123a and a connecting portion 123c of the curved portion 123, which will be described below.

A plurality of protrusions 121a protruding toward the inside in the radial direction are formed at the rising circumferential wall portion 121 in the circumferential direction at an interval.

The outer movable wall portion 122 gradually extends downward in the direction from the outside to the inside in the radial direction. The outer movable wall portion 122 and the rising circumferential wall portion 121 are connected via a curved surface portion 125 protruding upward. Then, the outer movable wall portion 122 is pivotable about the curved surface portion 125 such that the curved portion 123 is moved upward. Further, the movable wall portion 127 is disposed to be movable upward with a recessed circumferential wall portion 123b around a connecting portion with the rising circumferential wall portion 121.

A plurality of ribs 126 are radially disposed at the outer movable wall portion 122 around the bottle axis O. That is, the respective ribs 126 are disposed in the circumferential direction at the same interval. In a shown example, the ribs 126 are formed by intermittently and straightly extending a plurality of recesses 126a recessed upward in a curved surface in the radial direction. Accordingly, the ribs 126 have a waved shape in the bottle axis O direction in a view of a longitudinal cross-sectional direction.

The respective recesses 126a have the same shape and the same size, and are disposed in the radial direction at the same interval. Then, the plurality of ribs 126 are disposed at the same positions in the radial direction in which the plurality of recesses 126a are disposed. In each of the ribs 126, the recess 126a disposed at the outermost side in the radial direction in the plurality of recesses 126a approaches the curved surface portion 125 from the inside in the radial direction of the curved surface portion 125, and the recess 126a disposed at the innermost side in the radial direction approaches the curved portion 123 from the outside in the radial direction of the curved portion 123.

The curved portion 123 includes the lower tubular portion 123a disposed concentrically with the bottle axis O, continuously installed at the inner end portion in the radial direction of the outer movable wall portion 122, and having a diameter in the radial direction such that the diameter gradually decreases in the direction from the lower side to the upper side, the recessed circumferential wall portion 123b continuously installed at an outer circumferential edge of the above-mentioned closing wall portion 124 and having a diameter in the radial direction such that the diameter gradually increases with directed to the lower side, and the connecting portion 123c configured to connect the lower tubular portion 123a and the recessed circumferential wall portion 123b.

The connecting portion 123c has a curved surface protruding downward.

In addition, an annular rib 137 depressed upward in a curved surface is formed at an inner circumferential side of the connecting portion 123c (a connecting portion with the recessed circumferential wall portion 123b) throughout the entire circumference in the circumferential direction.

Here, an annular recess 130 depressed upward is formed at the connecting portion to the lower tubular portion 123a and the connecting portion 123c, which are the movable wall portion 127 throughout the entire circumference in the circumferential direction.

The lower tubular portion 123a has a curved surface protruding (swelling) downward.

An apex wall 134 of the annular recess 130 has a curved surface protruding upward. That is, a depressed curved surface having a size in the radial direction that gradually decreases in the direction from the lower side to the upper side as a whole and having an upper end portion protruding upward is provided. In addition, the radii of curvature of the above-mentioned lower tubular portion 123a and connecting portion 123c are formed to be smaller than that of the above-mentioned outer movable wall portion 122. Further, an inner portion disposed closer to the inside in the radial direction than the annular recess 130 in the movable wall portion 127 and the recessed circumferential wall portion 123b is disposed to be movable upward and around the annular recess 130.

The apex wall 134 of the annular recess 130 is disposed under the upper end portion of the above-mentioned curved surface portion 125 and over the connecting portion 123c. In addition, the annular recess 130 is disposed over the imaginary line L extending along with surface shapes of the outer end portion in the radial direction of the lower tubular portion 123a (the connecting portion with the outer movable wall portion 122) and the inner end portion in the radial direction of the connecting portion 123c (the connecting portion with the recessed circumferential wall portion 123b). Further, in an illustrated example, the connecting portion 123c is also disposed over the imaginary line L.

In addition, the length D1 in the radial direction from the curved surface portion 125 to the apex wall 134 of the annular recess 130 is larger than the length D2 in the radial direction from the apex wall 134 to the outer circumferential edge of the closing wall portion 124.

Figure 8:
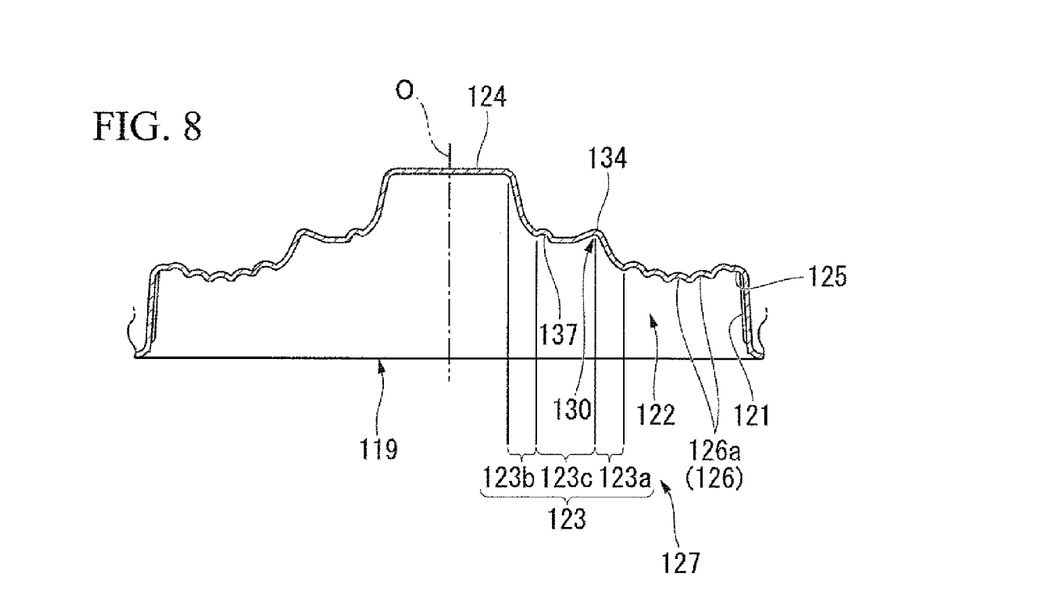
FIG. 8 is a cross-sectional view of a bottle bottom wall portion showing a bottle decompression state.

When the inside of the bottle 100 configured as described above is decompressed, first, as shown in FIG. 8, the movable wall portion 127 upwardly pivots about the curved surface portion 125 of the bottom wall portion 119. Accordingly, the movable wall portion 127 is moved so as to raise the recessed circumferential wall portion 123b and the closing wall portion 124 upward. That is, as the bottom wall portion 119 of the bottle 100 is actively deformed upon the decompression, internal pressure variation (decompression) of the bottle 100 can be absorbed without deformation of the drum portion 113 or the like. In this case, as the connecting portion between the rising circumferential wall portion 121 and the movable wall portion 127 is formed at the curved surface portion 125 protruding upward, the movable wall portion 127 can be easily moved (pivoted) around the upper end portion of the rising circumferential wall portion 121. For this reason, the movable wall portion 127 can be flexibly deformed according to the internal pressure variation of the bottle 100.

Figure 9:
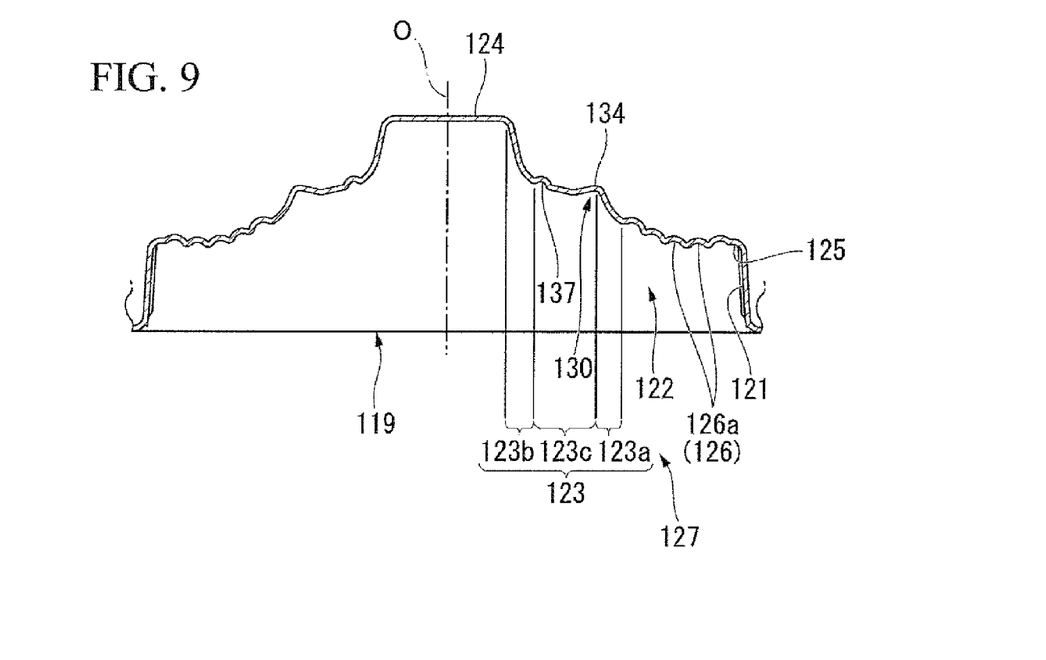
FIG. 9 is a cross-sectional view of the bottle bottom wall portion showing the bottle decompression state.
Figure 10:
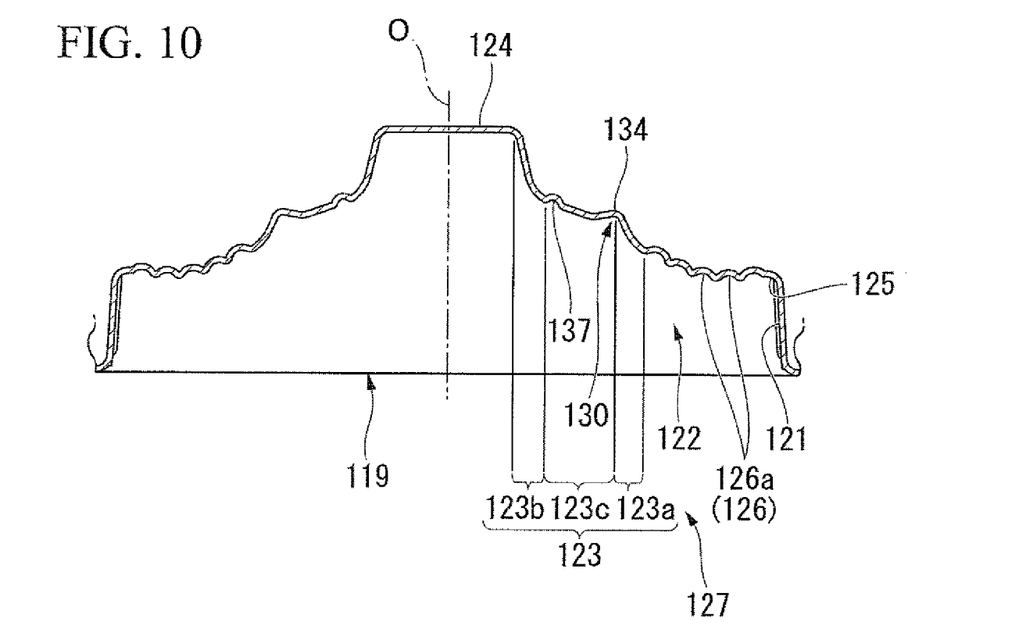
FIG. 10 is a cross-sectional view of the bottle bottom wall portion showing the bottle decompression state.

After that, when the inside of the bottle 100 is further decompressed, as shown in FIG. 9, as the area disposed closer to the inside in the radial direction than the annular recess 130 (the connecting portion 123c and the recessed circumferential wall portion 123b), i.e., the inner portion of the curved portion 123, upwardly pivots about the annular recess 130 of the movable wall portion 127, the closing wall portion 124 is further moved to be raised upward (see FIG. 10).

Accordingly, according to the embodiment, the outer movable wall portion 122 can move the inner portion of the curved portion 123 upward while moving the curved portion 123 and the closing wall portion 124 upward and around the curved surface portion 125 according to the decompression in the bottle 100. That is, the bottom wall portion 119 can be raised inward in the bottle 1 in a multi-stage shape. Accordingly, since the bottom wall portion 119 can be actively deformed, the decompression absorption performance of the bottle 100 can be improved.

In addition, upon the decompression in the bottle 100, the annular recess 130 can be easily deformed while increasing the size in the radial direction, and a sufficient upward movement amount of the curved portion 123 can be easily secured.

Further, the rib 137 is formed in the circumferential direction at the inner portion disposed closer to the inside in the radial direction than the annular recess 130 in the movable wall portion 127 and the recessed circumferential wall portion 123b. The rib 137 is formed at the connecting portion 123c to be depressed upward in a curved surface shape. As a result, when the bottle 100 is formed through biaxially oriented blow molding like the embodiment, a thickness of an intermediate portion disposed between the rib 137 and the annular recess 130 in the curved portion 123 can be formed to be reduced, and the intermediate portion can be easily deformed. Accordingly, the above-mentioned inner portion of the curved portion 123 can be easily further moved upward and around the annular recess 130, and thus the decompression absorption performance can be securely improved.

Hereinabove, while the second embodiment of the present invention has been described in detail with reference to the accompanying drawings, a specific constitution is not limited to the embodiment and includes design changes within a range not departing from the scope of the present invention.

For example, in the above-mentioned embodiment, while the case in which the annular recess 130 and the rib 137 are continuously formed throughout the entire circumference in the circumferential direction has been described., they are not limited thereto but may be intermittently formed throughout the entire circumference in the circumferential direction.

In addition, the plurality of annular recesses 130 and the plurality of ribs 137 may be formed in radial directions at intervals.

Further, cross-sectional shapes of the annular recess 130 and the rib 137 may be appropriately design-changed into a circular shape, a rectangular shape, or the like. Furthermore, the sizes of the annular recess 130 and the rib 137 may be varied.

In addition, in the above-mentioned embodiment, while the case in which pivotal movement about the curved surface portion 125 and pivotal movement about the annular recess 130 upon the decompression of the bottle 100 are sequentially performed has been described, the embodiment is not limited thereto but the pivotal movement about the curved surface portion 125 and the pivotal movement about the annular recess 130 may be performed in a reversed sequence or both of the pivotal movements may be simultaneously performed.

In addition, the rising circumferential wall portion 121 may be appropriately modified, for example, may extend parallel to the bottle axis O direction or may extend to be inclined with respect to the bottle axis O.

Further, the movable wall portion 127 may be appropriately modified, for example, may protrude parallel to the radial direction, or the like.

Furthermore, the uneven portion 117a may not be formed.

In addition, the synthetic resin material that forms the bottles 1 and 100 may be appropriately changed with, for example, polyethylene terephthalate, polyethylene naphthalate, non-crystalline polyester, or the like, or a blend material thereof.

Further, the bottles 1 and 100 are not limited to a single layer structure but may have a stacked-layer structure having an intermediate layer. As the intermediate layer, for example, a layer formed of a resin material having gas barrier characteristics, a layer formed of a recycled material, a layer formed of a resin material having an oxygen absorption property, or the like, may be used.

Furthermore, in the above-mentioned embodiment, while lateral cross-sectional shapes perpendicular to the bottle axes O of the shoulder portions 12 and 112, the drum portions 13 and 113 and the bottom portions 14 and 114 have circular shapes, the shapes are not limited thereto but may be appropriately modified into polygonal shapes.

In addition, the components in the above-mentioned embodiments can be appropriately substituted with known components without departing from the scope of the present invention, and the above-mentioned variants may be appropriately combined.

According to the above-mentioned bottle, decompression absorption performance in the bottle can be improved.

What is claimed is:

1. A bottomed cylindrical bottle formed of a synthetic resin material through biaxially oriented blow molding, comprising a bottom portion having a bottom wall portion, the bottom wall portion comprising in a non-decompressed state of the bottle:
   a ground portion disposed at an outer circumferential edge portion;
   a rising circumferential wall portion continuously extending upward so as to be connected to the ground portion from an inside in a bottle radial direction;
   a movable wall portion protruding from an upper end portion of the rising circumferential wall portion toward the inside in the bottle radial direction, the movable wall portion having an annular recess depressed upward in a circumferential direction thereof;
   a recessed circumferential wall portion having a diameter in the bottle radial direction such that the diameter gradually decreases in a direction from an inner end portion of the movable wall portion toward an upper side thereof; and
   a connecting portion between the rising circumferential wall portion and the movable wall portion,
   wherein the annular recess is divided into an apex portion, an outer curved wall connected to the apex portion from an outside in the bottle radial direction, and an inner curved wall connected to the apex portion from an inside in the bottle radial direction,
   the inner curved wall gradually extends upward in a direction from the inside to the outside in the bottle radial direction,
   the movable wall portion is configured to move upward with the recessed circumferential wall portion around the connecting portion with the rising circumferential wall portion with decompression of the bottle,
   an inner portion, disposed closer to the inside in the radial direction than the annular recess of the movable wall portion and the recessed circumferential wall portion, is configured to move upward and around the annular recess with decompression of the bottle,
   a first length from the connecting portion to the annular recess in the bottle radial direction is larger than a second length from the annular recess to an inner edge portion of the recessed circumferential wall portion in the bottle radial direction, and
   the annular recess remains present in the movable wall portion with decompression of the bottle.

2. The bottle according to claim 1, wherein the movable wall portion in the non-decompressed state of the bottle, at least at a location other than at the annular recess, has a curved surface protruding downward.

3. The bottle according to claim 1, wherein the outer curved wall gradually extends downward in a direction from the inside toward the outside in the bottle radial direction.

4. The bottle according to claim 2, wherein the outer curved wall gradually extends downward in a direction from the inside toward the outside in the bottle radial direction.

5. The bottle according to claim 1, wherein a rib is formed at the inner portion along with the circumferential direction, and the rib is formed through biaxially oriented blow molding.

\* \* \* \* \*